(12) United States Patent
Tew

(10) Patent No.: US 6,642,969 B2
(45) Date of Patent: Nov. 4, 2003

(54) COLOR WHEEL FOR A FALLING RASTER SCAN

(75) Inventor: Claude E. Tew, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 465 days.

(21) Appl. No.: 09/746,307

(22) Filed: Dec. 21, 2000

(65) Prior Publication Data

US 2002/0005914 A1 Jan. 17, 2002

Related U.S. Application Data

(60) Provisional application No. 60/173,859, filed on Dec. 30, 1999.

(51) Int. Cl.$^7$ .............................. H04N 9/12; G02B 5/22; G03B 21/14
(52) U.S. Cl. ........................................ 348/743; 348/759
(58) Field of Search ................................ 348/742, 743, 348/759; 353/31, 84; 359/634, 889, 891, 892; H04N 9/12; G02B 5/22; G03B 21/14

(56) References Cited

U.S. PATENT DOCUMENTS

| | | | | |
|---|---|---|---|---|
| 3,685,886 A | * | 8/1972 | Nakajima et al. | 348/270 |
| 4,090,219 A | * | 5/1978 | Ernstoff et al. | 348/742 |
| 4,698,564 A | * | 10/1987 | Slavin | 318/257 |
| 5,033,073 A | * | 7/1991 | Friddell | 378/146 |
| 5,371,543 A | | 12/1994 | Anderson | |
| 5,583,688 A | | 12/1996 | Hornbeck | |
| 6,220,730 B1 | * | 4/2001 | Hewlett et al. | 362/297 |
| 6,359,662 B1 | * | 3/2002 | Walker | 348/743 |
| 6,536,922 B1 | * | 3/2003 | Hewlett et al. | 362/290 |
| 2002/0135856 A1 | * | 9/2002 | Penn | 359/290 |
| 2002/0135862 A1 | * | 9/2002 | Dewald | 359/298 |

OTHER PUBLICATIONS

Dewald et al., "Sequential Color Recapture and Dynamic Filtering: A Method of Scrolling Color", SID 00 Digest, pp 1–4.*

U.S. patent application Ser. No. 60/173,941, Tew, filed Dec. 30, 1999.

U.S. patent application Ser No. 09/705,467, Dewald et al., filed Nov. 3, 2000.

U.S. patent application Ser. NO. 60/173,942, Dewald et al., filed Dec. 30, 1999.

* cited by examiner

*Primary Examiner*—John Miller
*Assistant Examiner*—Brian Yenke
(74) *Attorney, Agent, or Firm*—Charles A. Brill; Wade James Brady, III; Frederick J. Telecky, Jr.

(57) ABSTRACT

A dichroic spiral color wheel (108) having many spiral-shaped color filters (206). The boundary between adjacent color filters follows the spiral of Archimedes, defined as $r=a\theta$, where r is the radius of the boundary at a given point, a is a constant, and $\theta$ is the angle between a radial line through the given point and a reference radial. Using the spiral of Archimedes provides a boundary between adjacent color filters that is nearly parallel to the rows or columns of the modulator and moves across the light path at a constant speed. These two features make the spiral color wheel much more efficient than color wheels having pie shaped segments. The use of dichroic filters, which reflect out of band light is crucial to the operation of a sequential color recycling display system. When used in a sequential color recycling display system, small filter segments are used to enable on entire filter segment of each of the primary colors, and a clear segment if used, to be simultaneously imaged on the face of the light valve.

12 Claims, 1 Drawing Sheet

COLOR WHEEL FOR A FALLING RASTER SCAN

CROSS-REFERENCE TO RELATED APPLICATIONS

This application claims priority under 35 USC §119(e)(1) of provisional application number 60/173,859 filed Dec. 30, 1999.

The following patents and/or commonly assigned patent applications are hereby incorporated herein by reference:

| Patent No. | Filing Date | Issue Date | Title |
| --- | --- | --- | --- |
| 5,583,688 | Dec. 21, 1993 | Dec. 10, 1996 | Multi-Level Digital Micromirror Device |
| 5,371,543 | Aug. 17, 1993 | Dec. 6, 1994 | Monolithic Color Wheel |
| 60/173,941 | Dec. 30, 1999 | | Analog Pulse Width Modulation Cell For Digital Micromechanical Device |
| 09/705,467 | Nov. 03, 2000 | | Sequential Color Recapture For Projection Systems |
| 60/173,942 | Dec. 30, 1999 | | Rod Integrators for Light Recycling |

FIELD OF THE INVENTION

This invention relates to the field of display systems, more particularly to color display systems that use a falling raster or scrolling color scan.

BACKGROUND OF THE INVENTION

Modem projection light valve-based display systems typically use one of two schemes to produce full color images. Some systems use three light valves, each producing a primary color image. The three primary colored images are superimposed to give the viewer the perception of a full-color image. Three light valve display systems are generally expensive since there are essentially three separate projection systems and a set of dichroic filters uses as color splitters and combiners.

An alternative to the three light valve color systems uses only one light valve. The single light valve color systems sequentially produce three primary color images that are displayed in a rapid sequence. The viewer's eye integrates the three images giving the impression of a single full-color image. Single light valve color displays are typically less expensive than the three light valve color displays. However, the single light valve color displays must be very fast in order to produce the three primary colored images in a single frame period.

Micromirror-based display systems use pulse width modulation to produce images that have intermediate intensity shades. The video image data is received as a sequence of n-bit words, each word representing the intensity of a single pixel. The data is converted, through an operation often referred to as "corner turning," to a series of bit-planes, each comprised of a single bit of common significance for each pixel in the image. The combination of sequential color, pulse width modulation, and corner turning requires a lot of data processing at a very high data rate. The processing hardware required to perform these functions drives up the cost of the display system.

Prior art sequential color display systems use a rapidly rotating color wheel to sequentially filter the light beam. The wheel rotates fast enough that the boundary between color filters sweeps across the face of the modulator very quickly. The modulator is turned off during the filter transition time, or spoke period, when the light reaching the modulator was not a pure primary color. The light from the color wheel is focused onto the color wheel and modulator to avoid creating an image of the color wheel on the modulator.

One method of reducing the cost of a micromirror based display system is described in U.S. patent application No. TI-25123, which teaches a "thermometer scale" pulse width modulation scheme that generates a single pulse representative of the analog intensity of a given pixel for each primary color. The thermometer scale PWM methods are optimally coupled with a falling raster, or scrolling color, illumination system. A falling raster illumination system images the color wheel onto the light valve or modulator so that the boundary between the color segments sweeps across the face of the light valve. As the boundary sweeps across the face of the modulator, the data written to the modulator is changed from data representing a first primary color data to data representing a second primary color.

Although falling raster display systems promise to lower the overall cost of display systems, it is difficult to operate the light valve efficiently in the falling raster mode. Existing color wheels cannot provide multiple color bands to the modulator without relatively high inefficiencies at the interface between the primary color segments. What is needed is a method and system of scrolling two or more color segments across the face of the light valve.

SUMMARY OF THE INVENTION

Objects and advantages will be obvious, and will in part appear hereinafter and will be accomplished by the present invention that provides a method and system for producing a falling raster, or scrolling color, display system. One embodiment of the claimed invention provides a color wheel for a projection display system. The color wheel comprises a color wheel hub defining a center of the wheel, at least one dichroic color filter having a first pass band and supported by the hub, at least one dichroic color filter having a second pass band and supported by the hub, and at least one dichroic color filter having a third pass band and supported by the hub. The first, second, and third dichroic filters forming spirals abutting each other at an interface, the interface between two of the dichroic filters having a radius from said center defined by:

$$r = a\theta$$

where r is the radius or distance of the interface from said center, a is a constant, and $\theta$ defines an arc between the interface and a reference.

Another embodiment of the disclosed invention provides a display system. The display system is comprised of a light source for generating a beam of light along a first light path, a collection optic on the first light path for collecting the beam of light, a color wheel on the first light path for filtering the beam of light, a light valve on said first light path for receiving the filtered beam of light and selectively modulating the filtered beam of light to produce an image bearing beam of light along a second light path, and a projection optical system on the second light path for focusing the image bearing beam of light onto an image plane. The color wheel is comprised of a color wheel hub defining a center of the wheel, at least one dichroic color filter having a first pass band and supported by the hub, at least one dichroic color filter having a second pass band and supported by the hub, and at least one dichroic color filter having a third pass band and supported by said hub. The first, second, and third dichroic filters forming spirals abutting each other at an interface, the interface between two of the dichroic filters having a radius from the center defined by:

$$r=a\theta$$

where r is the radius or distance of the interface from the center, a is a constant, and θ defines an arc between the interface and a reference.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A display system has been developed that uses a spiral color wheel having multiple thin color segments to allow imaging at least two, and preferably three, primary color segments on a light valve. The light valve is operated synchronously with the color wheel to ensure color-appropriate data is provided to the elements of the light valve as light of the various primary colors sweeps across the face of the light valve.

Figure 1:
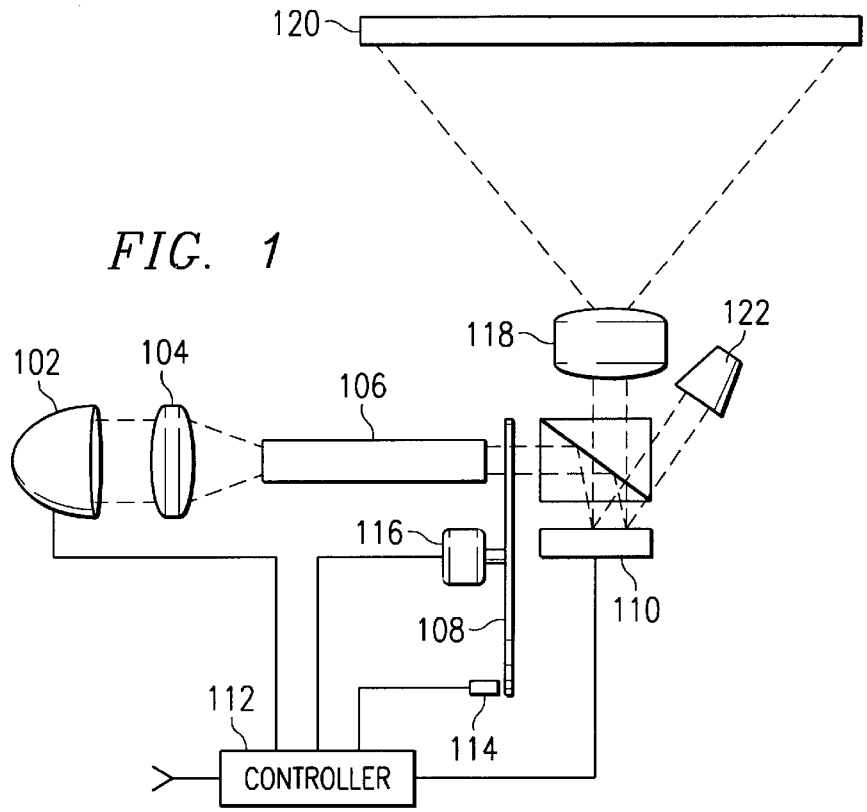
FIG. 1 is a schematic view of a scrolling color display system according to one embodiment of the present invention.

FIG. 1 is a schematic illustration of a typical display system according to the present invention. In FIG. 1, light from light source 102 is focused by a collection optic 104 onto the entrance end of an integrating light rod 106. The light travels through the rod 106, which either can be hollow with mirrored internal surfaces, or a solid transparent component. As the light travels through the rod 106, it is reflected by the sides of the rod 106 becoming homogenous across the light beam by the time the light beam exits the exit end of the integrating rod 106. If the integrating rod 106 is hollow, the mirrored internal surfaces of the rod 106 reflect the light traveling through the rod. If the rod is solid, the light undergoes total internal reflection at the interface between the light rod 106 and the air surrounding the light rod 106.

Light exiting the integrating rod 106 is filtered by the novel spiral color wheel 108 described herein. As described below, the light passing through the color wheel 108 is imaged onto a light valve 110, shown in FIG. 1 as a micromirror device. The light rejected by the dichroic filters of the color wheel 108 is reflected back into the integrating rod 106 where it can be recaptured and recycled. As described in TI-29879, careful arrangement of the illumination optics—light source 102, collection optic 104, integrating rod 106, and color wheel 108—enables the display system to reuse the light rejected by the dichroic filters of the color wheel, dramatically increasing the brightness of the display system.

The light valve 110 modulates the light incident the light valve in response to image data signals received from a display system controller 112. The controller synchronizes the image data signals provided to the light valve with the rotation of the color wheel 108 as detected by an index mark detector 114 or some other sensing means such as measurement such as signals from the color wheel motor 116.

When a micromirror is used as the light valve 110, portions of the light reaching each micromirror element are either reflected through a projection optic 118 to an image plane 120 to form a bright pixel on the image plane, or the light is reflected away from the image plane to a light dump 122.

Figure 2:
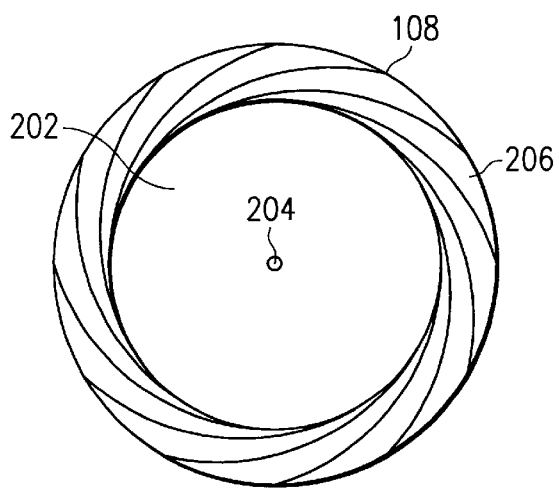
FIG. 2 is a plan view of one embodiment of a novel color wheel.

One embodiment of a recycling spiral color wheel 108 according to the present invention is shown in FIG. 2. The embodiment shown in FIG. 2 has a large filter-free hub area 202 with a hole 204 used to mount the color wheel 108 a motor shaft. The size of the color wheel 108, and the size of the hub area 202 vary depending on the size of the display and the size of the light valve being used. The number of individual filters formed on the color wheel varies depending on the intended speed of the color wheel and the number of times each primary color is used during a given frame period.

Light valves are comprised of a large number of individual modulator elements. The elements typically are arranged in an orthogonal array and are addressed by row and column. Some light valves, such at the digital micromirror device (DMD™), provide common control signals to groups of rows—called reset blocks in the DMD. A typical DMD has 16 reset blocks. All elements in a given reset block are provided the said bias signal to rotate and reset the mirror. The direction the mirror rotates is determined by a unique address signal applied to each element.

Because the light valve elements are organized as an orthogonal array, the boundaries between adjacent color fields in falling raster display systems should be parallel to the rows or columns. If the boundary is not parallel, a given row simultaneously will be two colors. When a transition between two adjacent color filters causes two colors to be present on a row at the same time, the mapping of single color data to the modulator elements becomes very complex. Consequently, the row is typically turned off until the color transition is complete and the row returns to a single color. Turning off a row of elements, or an entire reset group of elements, reduces the efficiency of the display system and lowers the brightness of the image produced by the display system.

Standard color wheels with pie-shaped sections are very inefficient when used with a falling raster display system. The angle of the boundary between adjacent color filters of a standard color wheel changes with respect to the light valve as the boundary passes through the light path. Not only does the angle of the boundary change, the direction of slope and the speed at which the boundary sweeps across the face of the modulator also changes. Very large color wheels lessen the angular change, but are unacceptable in modern compact display systems. A solution is the spiral color wheel shown in FIG. 2.

Figure 3:
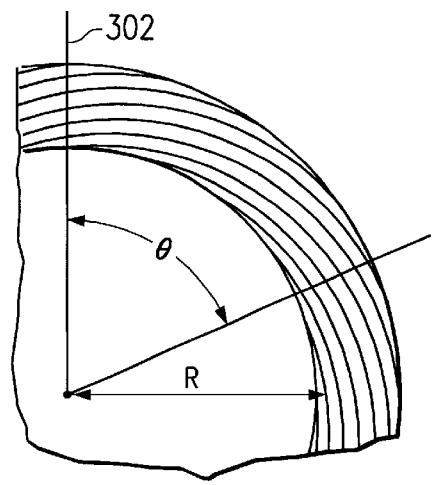
FIG. 3 is a plan view of a portion of the color wheel in FIG. 2 detailing the curvature of the filter segments.

The spiral color wheel of FIG. 2 has color filters whose boundaries form the "spiral of Archimedes." The spiral of Archimedes is defined by:

$$r=a\theta$$

where r is the radius or distance of said interface from said center, a is a constant, and θ defines an arc between said interface and a reference. A different reference is used for each boundary between two filters. FIG. 3 shows the relationship between the reference 302, θ, and the radius r. The result of using the spiral of Archimedes is that each boundary approximates an inclined plane sliding past the light valve. The boundary is not straight, so it cannot be parallel to the rows of modulator elements. The boundary does, however, form a very shallow curve that is tangential to the rows of the modulator elements and the boundary maintains the same curve and speed across the entire face of the modulator, even when using a small filter wheel.

Figure 4:
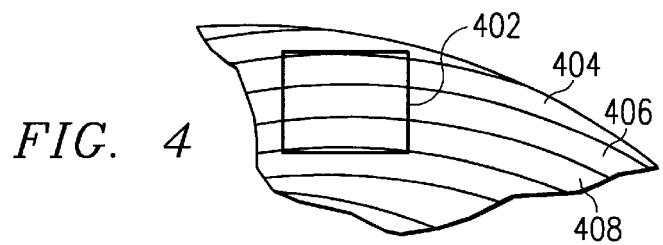
FIG. 4 is a plan view of a portion of the color wheel of FIG. 2 showing the relationship between the color wheel and the illumination light path used to illuminate a light valve.

FIG. 4 shows a small portion of the color wheel of FIG. 2 showing the outline 402 of the light beam illuminating the color wheel. The outline 402 of the light beam also represents the active portion of the light valve and shows the simultaneous illumination of the light valve by multiple color filter segments. Falling raster display systems typically illuminate the light valve with at least two colors at all times. As discussed above, the disclosed color wheel is ideally suited for use in a sequential color recycling display system. Sequential color recycling systems typically illuminate an equal portion of the light valve with each of the primary colors. As shown in FIG. 4, the face of the light valve 402 is illuminated by equal portions of red 404, green 406, and blue 408 light. Although not shown in FIG. 4, some display systems, including sequential color recycling systems, provide a clear segment in the color wheel. The use of a clear segment increases the potential brightness of the display system at the cost of color saturation. Since natural images rarely have saturated colors, the increased brightness is often well worth the decreased saturation.

Although current DMD designs group the modulator elements in reset groups comprised of a number of complete rows, future designs can group the elements in groups comprised of a number of complete columns of elements. Changing the grouping of the elements would require changing the orientation of the light valve outline 402 shown in FIG. 4, and would provide a better match between the boundaries of the filter segments and the reset groups. As mentioned above, the spiral of Archimedes color segments provide a curved boundary between segments. This curve prevents perfect alignment between the reset groups and the filter boundaries. The longer the segment of the boundary illuminated, the greater the effect of the curvature on the alignment. Turning the modulator 90° from the orientation shown in FIG. 4 uses a shorter portion of the boundary and allows the use of larger filter segments, especially when used with widescreen formats such as the 16:9 HDTV format.

Due to the number and shape of the color filters, the color wheel described above is difficult to manufacture. U.S. Pat. No. 5,371,543, entitled "Monolithic Color Wheel" and issued on Dec. 6, 1994, provides a method of manufacturing a color wheel that enables a large number of dichroic filters, of virtually any shape, to be formed on a common substrate. The resulting color wheel typically is lighter than other color wheels, can be less expensive to manufacture, and does not need to be balanced before being used in a display system.

Thus, although there has been disclosed to this point a particular embodiment for a falling raster display system and method therefore etc., it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A color wheel for a projection display system, the color wheel comprising:
    a color wheel hub defining a center of said wheel;
    at least one dichroic color filter having a first pass band and supported by said hub;
    at least one dichroic color filter having a second pass band and supported by said hub; and
    at least one dichroic color filter having a third pass band and supported by said hub;
    said first, second, and third dichroic filters forming spirals abutting each other at an interface, said interface between two of said dichroic filters having a radius from said center defined by:
ti $r = a\theta$ where r is the radius or distance of said interface from said center, a is a constant, and θ defines an arc between said interface and a reference.

2. The color wheel of claim 1, said constant chosen such that a light beam impinging on said color wheel illuminates at least two filter segments at all times.

3. The color wheel of claim 1, said constant chosen such that a light beam impinging on said color wheel illuminates at least one filter of each of said first, second, and third passbands.

4. The color wheel of claim 1, further comprising at least one spiral clear segment between two of said dichroic filters.

5. The color wheel of claim 4, said constant chosen such that a light beam impinging on said color wheel illuminates at least one filter of each of said first, second, and third passbands, and at least one of said spiral clear segments.

6. A display system comprising:
    a light source for generating a beam of light along a first light path;
    a collection optic on said first light path for collecting said beam of light;
    a color wheel on said first light path for filtering said beam of light, said color wheel comprised of:
        a color wheel hub defining a center of said wheel;
        at least one dichroic color filter having a first pass band and supported by said hub;
        at least one dichroic color filter having a second pass band and supported by said hub; and
        at least one dichroic color filter having a third pass band and supported by said hub, said first, second, and third dichroic filters forming spirals abutting each other at an interface, said interface between two of said dichroic filters having a radius from said center defined by:

$r = a\theta$ where r is the radius or distance of said interface from said center, a is a constant, and θ defines an arc between said interface and a reference;
    a light valve on said first light path for receiving said filtered beam of light and selectively modulating said filtered beam of light to produce an image bearing beam of light along a second light path; and
    a projection optical system on said second light path for focusing said image bearing beam of light onto an image plane.

7. The display system of claim 6, said constant chosen such that a light beam impinging on said color wheel illuminates at least two filter segments at all times.

8. The display system of claim 6, said constant chosen such that a light beam impinging on said color wheel illuminates at least one filter of each of said first, second, and third passbands.

9. The display system of claim 6, further comprising at least one spiral clear segment between two of said dichroic filters.

10. The display system of claim 9, said constant chosen such that a light beam impinging on said color wheel illuminates at least one filter of each of said first, second, and third passbands, and at least one of said spiral clear segments.

11. The display system of claim 6, said collection optic comprised of an integrator rod.

12. The display system of claim 6, said projection optical system comprised of a projection lens.

* * * * *